(12) United States Patent
Hwang et al.

(10) Patent No.: US 8,378,796 B2
(45) Date of Patent: Feb. 19, 2013

(54) PORTABLE TERMINAL (75) Inventors: Yong-Jin Hwang, Seoul (KR);
Won-Seok Joo, Seoul (KR); Young-Min Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 843 days.

(21) Appl. No.: 12/483,192

(22) Filed: Jun. 11, 2009

(65) Prior Publication Data

US 2009/0315690 A1 Dec. 24, 2009

(30) Foreign Application Priority Data

Jun. 19, 2008 (KR) .................. 10-2008-0058058

(51) Int. Cl.
*H04B 3/36* (2006.01)
*G09G 5/00* (2006.01)
*G06F 3/041* (2006.01)

(52) U.S. Cl. .............. 340/407.2; 340/407.1; 345/173; 345/156; 345/169

(58) Field of Classification Search .............. None
See application file for complete search history.

(56) References Cited

U.S. PATENT DOCUMENTS

| | | | |
|---|---|---|---|
| 2002/0149561 A1* | 10/2002 | Fukumoto et al. | 345/156 |
| 2006/0012576 A1* | 1/2006 | Hafez et al. | 345/173 |
| 2009/0001855 A1* | 1/2009 | Lipton et al. | 310/331 |
| 2009/0009301 A1* | 1/2009 | Yang et al. | 340/407.1 |
| 2009/0102805 A1* | 4/2009 | Meijer et al. | 345/173 |
| 2009/0128305 A1* | 5/2009 | Mortimer et al. | 340/407.1 |
| 2010/0079399 A1* | 4/2010 | Ma | 345/174 |
| 2011/0210926 A1* | 9/2011 | Pasquero et al. | 345/173 |
| 2011/0304574 A1* | 12/2011 | Harrison | 345/173 |

* cited by examiner

*Primary Examiner* — Julie Lieu
(74) *Attorney, Agent, or Firm* — Lee, Hong, Degerman, Kang & Waimey (57) ABSTRACT

A portable terminal and method of providing tactile sensation responsive to user touching at the portable terminal is provided. The portable terminal includes a housing disposed beneath a touch screen display, such that the housing is configured to impact the touch screen display in response to a user input impressed by touch on at least a portion of the touch screen display, the housing including at least one magnetic device configured to collide with the housing. The portable terminal further including a magnetic actuator disposed relative to the at least one magnetic device, such that the magnetic actuator controls a first magnetism that displaces the least one magnetic device having a second magnetism thereby creating the impact between the at least one magnetic device and the housing.

11 Claims, 9 Drawing Sheets

PORTABLE TERMINAL

CROSS REFERENCE TO RELATED APPLICATIONS

Pursuant to 35 U.S.C. §119, this application claims the benefit of earlier filing date and right of priority to Korean Application No. 10-2008-0058058 filed in Korea on Jun. 19, 2008, the entire contents of which is hereby incorporated by reference in its entirety.

BACKGROUND

1. Field of the Disclosure

The present disclosure relates to a portable terminal providing diverse senses of touch resulting from impacts.

2. Description of the Related Art

A portable terminal is a device that can be carried around and has one or more functions such as voice and video call communication, inputting and outputting information, and storing data.

As such functions become more diversified, the portable terminal can support more complicated functions such as capturing images or video, reproducing music or video files, playing games, and receiving broadcast signals. By comprehensively and collectively implementing such functions, the portable terminal may be embodied in the form of a multimedia player or device.

In order to implement various functions of such multimedia players or devices, the multimedia player requires sufficient hardware and software support, for which numerous attempts are being made and implemented. For example, a user interface allowing users to easily and conveniently search for and select one or more functions continues to be developed.

In order to provide a more convenient user interface while allowing a simpler and slimmer external appearance for portable terminals, a touch type input method is preferred. However, the touch type input method has a problem in that it does not allow users to properly recognize whether an input has been actually executed. Thus, a user interface of a portable terminal that allows users to recognize whether a corresponding execution has been performed in response to a user input is desirable.

SUMMARY

In one aspect of the present invention, a method of providing tactile sensation responsive to a user touching a portable terminal is provided. The method includes receiving an input impressed by touch on at least a portion of a touch screen display, and impacting the at least a portion of the touch screen display responsive to the received input thereby indicating execution of the input.

In another aspect of the present invention, a portable terminal is provided. The portable terminal includes a housing disposed beneath a touch screen display, such that the housing is configured to impact the touch screen display in response to a user input impressed by touch on at least a portion of the touch screen display, the housing including at least one magnetic device configured to collide with the housing. The portable terminal further includes a magnetic actuator disposed relative to the at least one magnetic device, such that the magnetic actuator controls a first magnetism that displaces the at least one magnetic device having a second magnetism thereby creating the impact between the at least one magnetic device and the housing.

In another aspect of the present invention, a portable terminal for providing a tactile sensation responsive to user touching is provided. The portable terminal includes a touch screen display configured to receive an input impressed by touch on at least a portion of the touch screen display. The portable terminal also includes a tactile operative module configured to generate a tactile signal in response to the received input thereby indicating execution of the input, wherein the tactile operative module includes a housing configured to transmit the tactile signal to the at least a portion of the touch screen display impressed by the touch. The tactile operative module also includes at least one magnetic device having a first type of magnetism such that the at least one magnetic device is displaced to a distance and recoils thereby creating the tactile signal upon impact to the housing. The tactile operative module further includes a magnetic actuator having a second type of magnetism to displace the at least one magnetic device in response to the received input.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached FIGS., the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different FIGS. represent the same, equivalent, or similar features, elements, or aspects in accordance with one or more embodiments.

DETAILED DESCRIPTION OF THE DISCLOSURE

The present invention will be described in detail with reference to the accompanying drawings in which exemplary embodiments of the invention are shown. The term 'portable terminal', as used herein, may indicate a mobile phone, a smart phone, a laptop book computer, a digital broadcast receiver, a personal digital assistant (PDA), a portable multimedia player (PMP), or a navigation device. The terms 'module' and 'unit', as used herein, may be used interchangeably.

Figure 1:
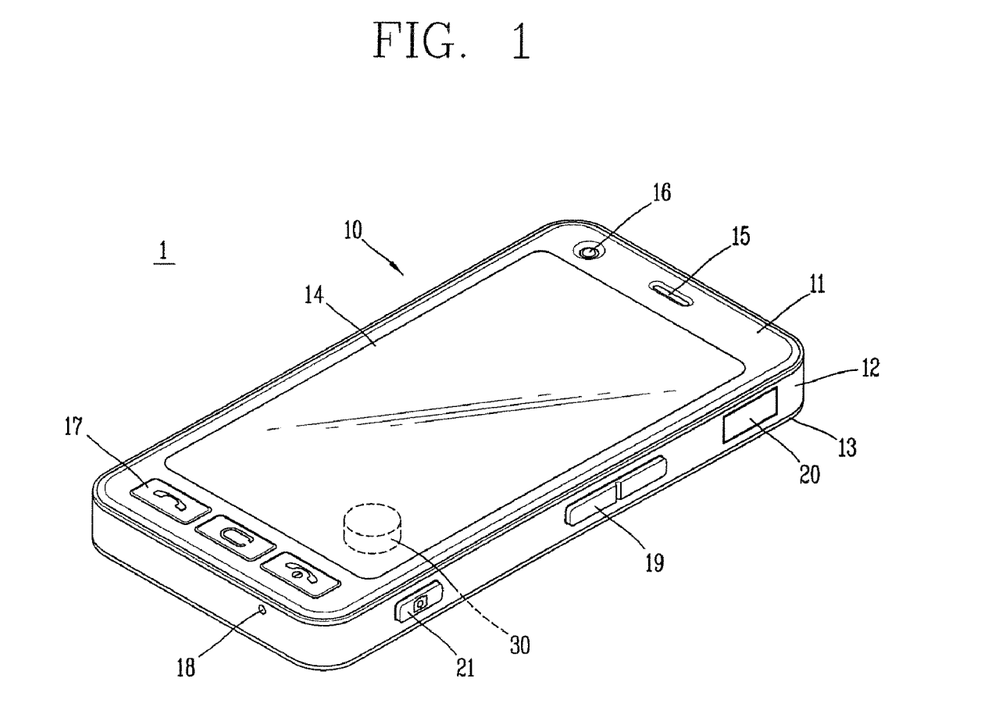
FIG. 1 is a front perspective view of a portable terminal according to an embodiment of the present disclosure.

FIG. 1 is a front perspective view of a portable terminal according to an embodiment of the present disclosure. As shown in FIG. 1, the portable terminal 1 includes a terminal body 10, which is a bar type.

The terminal body 10 includes a case (casing, housing, cover, etc.) constituting the external appearance. The shapes of the terminal body may not be limited to the shape as illustrated in FIG. 1 and can be applicable to a slide type, a folder type. The cases 11, 12, and 13 may be formed by injection-molding with a synthetic resin or may be made of a metallic material such as stainless steel (STS) or titanium (Ti).

A touch screen 14, an audio output unit 15, an image input unit 16, and a first manipulation unit 17 may be disposed on a front surface of the terminal body 10. The touch screen 14 may include a display such as an LCD (Liquid Crystal Display), and an OLED (Organic Light Emitting Diode), that visually displays information.

The touch screen 14 may include a touch detecting unit for inputting in a tactile manner. Thus, when a touch is applied to at least a portion of the touch screen 14, content corresponding to the touched position is input. The content input via the touch screen 14 may be a character, numerical figure or a menu item that may be indicated or designated in various modes. The touch detecting unit may be formed to be transparent thereby allowing an internal display to be visible and may have a structure for increasing visibility of the touch screen 14.

The audio output unit 15 may be implemented in the form of a receiver for transferring a call sound to the ear of the user or a loud speaker. A first manipulation unit (or user interface) 17 may be implemented as a dedicated input device separate from the touch screen 14 on which an inputting operation is performed in a tactile manner. The first manipulation unit 17 may be formed as a push-type key or button, or in the alternative, implemented in a touch detection manner.

The image input unit 16 may be implemented in the form of a camera module for capturing images or video with respect to the user and other objects. A camera control input 21 may be implemented at the side of the terminal body 10 to control the operation of the camera module 16.

The first manipulation unit 17 and second manipulation unit 19 may be generally referred to as a manipulation portion 130, and various methods and techniques can be employed for the manipulation units 17 and 19 so long as they can be operated by the user in a tactile manner. For example, the manipulation units 17 and 19 can be implemented as dome switches, touch screens or touch pads that can receive user commands or information according to the user's touch operations (e.g., pressing, pushing, swiping, drag-and-drop, etc.) or may be implemented in the form of a rotatable control wheel (or disc), keys or buttons, a jog dial, or a joystick.

The first manipulation unit 17 is used for inputting (entering) commands such as start, end, or scroll, whereas the second manipulation unit 19 is used as a hot key for controlling a controllable state amount, such as volume, brightness, or menu searching.

A second user input unit 19 and an audio input unit 18 may be disposed at the side of the terminal body 10. The audio input unit 18 may be appropriately implemented in the form of a microphone to detect user voice inputs, surrounding audio inputs.

An external interface 20 may be disposed at the side of the terminal body 10. The external interface 20 may serve as a communication link through which the terminal can exchange data with an external device. For example, the external interface 20 may be implemented in the form of a connection port for connecting an earphone to the portable terminal via a fixed or wireless means, a port for short-range communications (e.g., an Infrared Data Association (IrDA) port, a Bluetooth™ port, a wireless LAN port, etc.), power supply ports for providing power to the portable terminal 1. The external interface 20 may be a card socket for accommodating a SIM (Subscriber Identification Module) card or a UIM (User Identity Module) card, or an external card such as a memory card for storing information.

An additional audio output means may be disposed on the rear case 13. The additional audio output means may implement a stereo function together with the audio output unit 15 installed on the front case 11, and may be used for a call in a speaker phone mode.

Additionally, an tactile operative module 30 for substantially generating a tactile sensation according to an impact is provided in the terminal body 10. In order to provide a "clicking" sensation when a touch is applied to the touch screen, the tactile operative module 30 may operate in response to the touch or operate according to a pre-set or programmed method for various notifications provided by the portable terminal 1.

The tactile operative module 30 may be disposed on an arbitrary position of the terminal body 10. When the tactile operative module 30 is disposed at a corner of the terminal body 10 as shown in FIG. 1 and a touch is applied at a distance from the tactile operative module 30, an impact by the tactile operative module 30 may be adjusted to collectively transfer a tactile sensation to the touched portion.

Therefore, a scheme for correcting the impact by the tactile operative module 30 according to the distance from the tactile operative module 30 to a discernable position on the touch screen 14 can be provided. When the impact of the tactile operative module 30 is used as various notification signals provided by the terminal 1, the degree, operation time and the number of impacts of the tactile operative module 30 may be set differently according to the characteristics of the notification signals.

Figure 2:
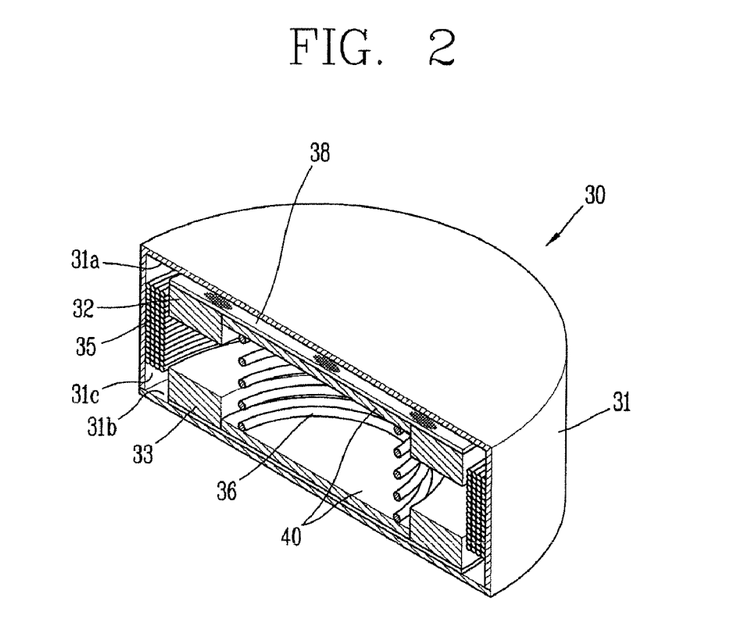
FIG. 2 is a perspective cross-sectional view of a tactile operative module according to an embodiment of the present disclosure.

FIG. 2 is a perspective cross-sectional view of a tactile operative module according to an embodiment of the present disclosure. As shown in FIG. 2, the tactile operative module 30 includes a housing 31, magnetic devices 32 and 33, a magnetic actuator 35, and an elastic body 36.

The housing 31 has a substantially cylindrical shape, and the shapes of the magnetic devices 32 and 33 and the magnetic actuator 35 also have the corresponding cylindrical shape. The shapes of the housing 31, the magnetic devices 32 and 33, and the magnetic actuator 35 may be modified in various forms without being limited thereto.

The housing 31 is fixed in the terminal body 10 to transfer an impact to the outside. Upper inner wall 31a and lower inner wall 31b of the housing 31 serve as surfaces with which the magnetic devices 32 and 33 collide. A dedicated panel or pad for an additional impact may be installed on the upper and lower inner walls 31a and 31b.

An impact adjusting pad 38 for adjusting an impulse created by the magnetic devices 32 and 33 may be mounted on the upper and lower inner walls 31a and 31b of the housing or at the magnetic devices 32 and 33. FIG. 2 illustrates the impact adjusting pad 38 attached to the magnetic devices 32 and 33.

The impact adjusting pad 38 may be made of at least one of rubber, steel and polymer. When the impact adjusting pad 38 is made of rubber, an impact of the magnetic devices 32 and 33 may be reduced thereby damping increasing amplitudes from the impact.

The material of the impact adjusting pad 38 may be variably selected in consideration of a sound effect when the magnetic devices 32 and 33 collide. For example, the impact adjusting pad 38 may be made of wood or glass.

The magnetic devices 32 and 33 contain magnetism, and are installed such that they move to collide with the upper and lower inner walls 31a and 31b of the housing 31. The magnetic devices 32 and 33 may include a permanent magnet for retaining magnetism.

FIG. 2 illustrates the magnetic devices 32 and 33 formed as an upper magnetic device 32 and a lower magnetic device 33. The upper magnetic device 32 and the lower magnetic device 33 are each disposed symmetrically relative to the magnetic actuator 35, so both the upper magnetic device 32 and the lower magnetic device 33 may be controlled by the magnetic actuator 35.

An impact direction of the upper magnetic device 32 and that of the lower magnetic device 33 are the opposite, in which each of the magnetic devices 32 and 33 have opposing magnetic poles. For example, the upper magnetic device 32 collides with the upper inner wall 31a and the lower magnetic device 33 collides with the lower inner wall 31b to generate an impact.

The elastic body 36a is installed to apply elasticity in a direction in which the upper magnetic device 32 and the lower magnetic device 33 come in contact with the upper and lower inner walls 31a and 31b. Support plates 40 are provided to support the upper magnetic device 32, the lower magnetic device 33 and the elastic body 36a during impact.

Accordingly, in order to make the upper magnetic device 32 collide with the upper inner wall 31a, the elastic body 36a is deformed. For example, the elastic body 36a is compressed thereby creating a repelling force against one of the magnetic devices 32 and 33 to create the impact.

In FIG. 2, the elastic body 36a is formed as a compression spring supported between the upper magnetic device 32 and the lower magnetic device 33. However, the elastic body 36a may be implemented in other forms such as a plate spring using materials such as rubber or plastic.

The magnetic actuator 35 is configured to possess magnetism that can control the movement of each of the magnetic devices 32 and 33 by providing adjustable levels of magnetism towards the magnetic devices 32 and 33. In FIG. 2, the magnetic actuator 35 is formed in a coil and positioned against the side inner wall 31c of the housing 31.

The magnetic devices 32 and 33 have a disk or ring shape so as to be moved along a central path of the magnetic actuator 35. The magnetic actuator 35 may include a core to form a magnetic circuit.

Directional movement or degrees of impact of the magnetic devices 32 and 33 can be determined according to to the amount of applied current to the magnetic actuator 35. Hereinafter, the impact of the magnetic devices 32 and 33 according to the controlling of the magnetism of the magnetic actuator 35 will now be described.

Figure 3A:
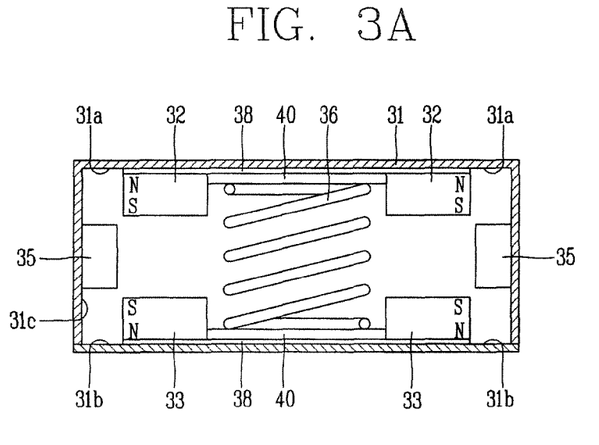
FIGS. 3A to 3C and 4A to 4C are cross-sectional views illustrating an operational state of the tactile operative module according to one embodiment of the present disclosure.
Figure 3B:
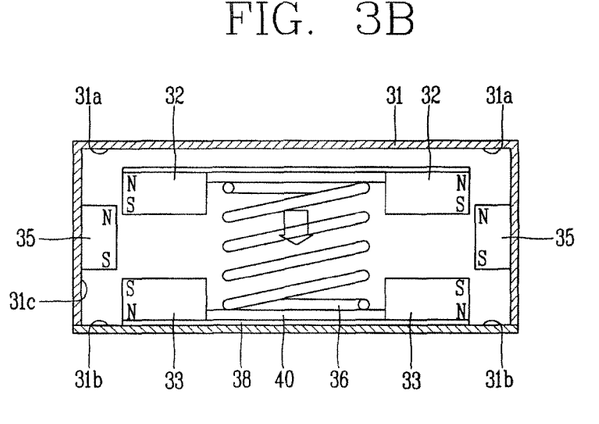
Figure 3C:
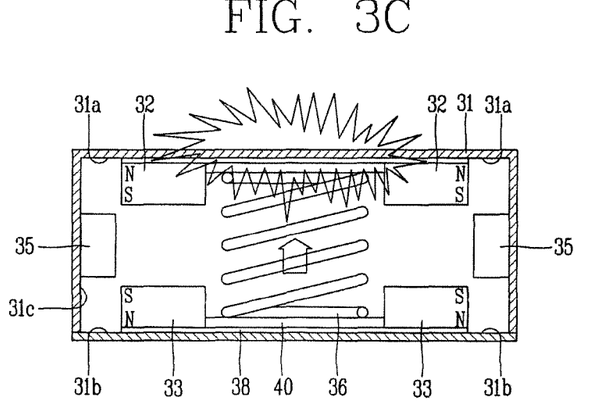
Figure 4A:
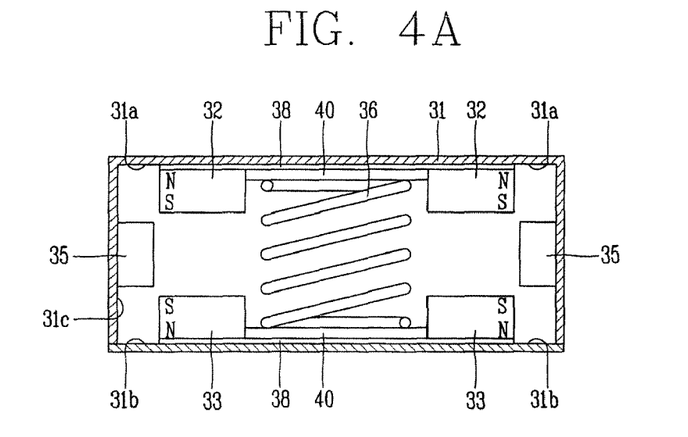
Figure 4B:
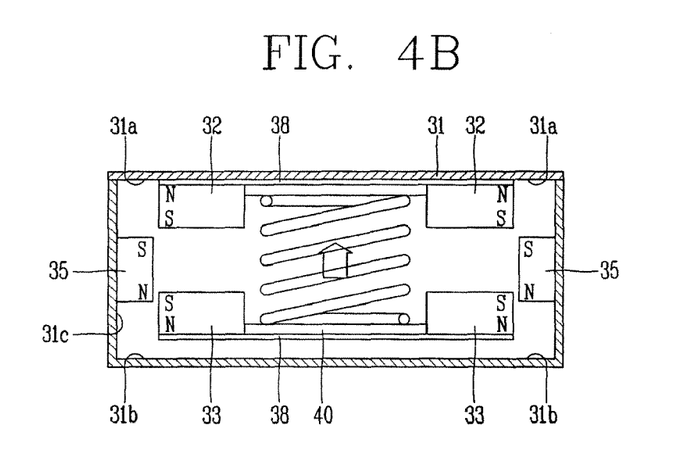
Figure 4C:
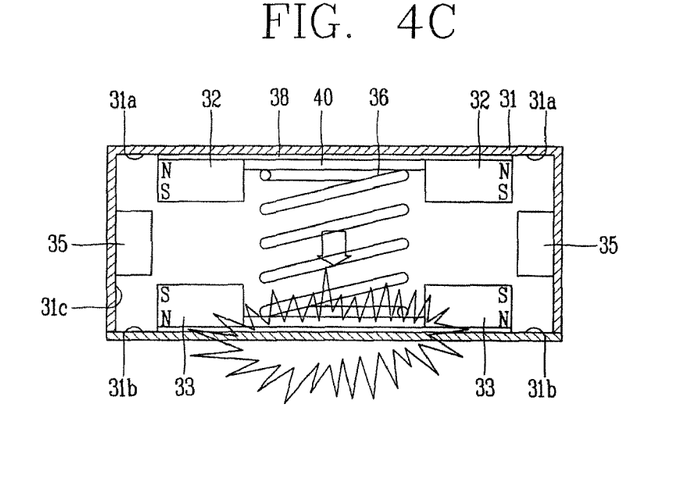

FIGS. 3A to 3C and 4A to 4C are cross-sectional views illustrating an operational state of the tactile operative module according to one embodiment of the present disclosure. Specifically, FIGS. 3A to 3C illustrate the case where an upper impact is generated, and FIGS. 4A to 4C illustrate the case where a lower impact is generated.

When the touch screen 14 is not touched, there is no need to generate a notification, which is hereinafter referred to as 'standby state', thereby no current is applied to the magnetic actuator 35, and no magnetism is generated. The upper magnetic device 32 and the lower magnetic device 33 are maintained to be in contact with the upper and lower inner walls 31a and 31b of the housing 31 by the elastic force of the elastic body 36.

The upper magnetic device 32 and the lower magnetic device 33 are positioned to be movable according to interaction with the magnetic force by the magnetism formed at the magnetic actuator 35. The magnetic poles of the upper magnetic device 32 and the lower magnetic device 33 are arranged to be mutually opposite so that a repelling force exists between them. In this embodiment, the magnetic poles of the upper magnetic device 32 are formed in the order of N pole and S pole, whereas the magnetic poles of the lower magnetic device 33 are formed in the order of S pole and N pole.

When the magnetic actuator 35 is magnetized upon receiving current, only one of the upper magnetic device 32 and the lower magnetic device 33 responds to the magnetic actuator 35, such that the responding magnetic device moves toward the magnetic actuator 35 by virtue of attraction. Alternatively, the magnetic device not responding to the magnetic actuator 35 receives a repelling force towards a direction away from the magnetic actuator 35, but maintains its original position such that it is pressed against the corresponding upper and lower inner walls 31a and 31b of the housing 31.

With reference to FIG. 3B, the magnetic poles of the magnetic actuator 35 are formed in the order of N pole and S pole by the current flowing across the magnetic actuator 35, the upper magnetic device 32 moves toward the lower magnetic device 33 due to the attraction between the magnetic actuator 35 and the upper magnetic device 32. When the current applied to the magnetic actuator 35 is interrupted as illustrated in FIG. 3C, the magnetism is removed and the upper magnetic device 32 moves to its original position by a restoration force of the elastic body 36a and, therefore, striking the upper inner wall 31a of the housing 31 (FIG. 3C).

Alternatively, when current is applied in the opposite direction to the magnetic actuator 35 in the standby state as shown in FIG. 4A, the magnetic actuator 35 is magnetized in the opposite direction from that of FIG. 3A. Thus, the lower magnetic device 33 is moved toward the upper magnetic device 32 according to attraction between the magnetic actuator 35 and the lower magnetic device 33.

The upper magnetic device 32 receives a repelling force towards a direction away from the magnetic actuator 35, but maintains its original position such that it is pressed against the upper inner wall 31a of the housing 31 (FIG. 4B). In the state of FIG. 4B, when the current applied to the magnetic actuator 35 is cut off, its magnetism is removed and the lower magnetic device 33 is moved to its original position by the restoration force of the elastic body 36a and, therefore, strikes the lower inner wall 31b of the housing (FIG. 4C).

By controlling the strike order, and time of the upper and lower magnetic devices 32 and 33 according to the change in the magnetism of the magnetic actuator 35, a "clicking" function of a physical switch (e.g., a dome switch, a tact switch, etc.) can be emulated. Accordingly, when a touch is applied to the touch screen or the touch pad, a user can feel a similar tactile sensation as when the user substantially presses such physical switch.

Figure 5A:
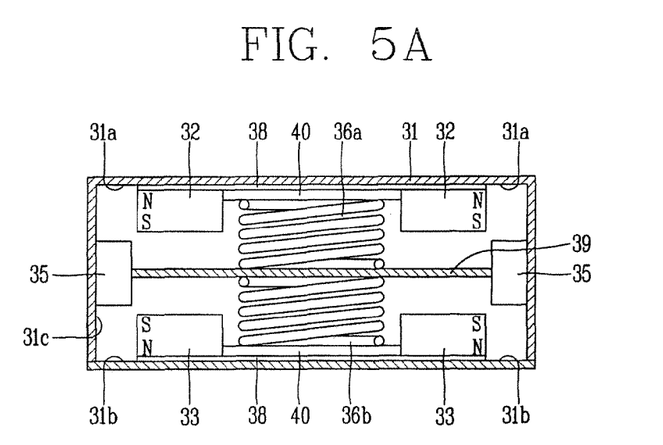
FIGS. 5A to 5C are cross-sectional views illustrating an operational state of the tactile operative module according to another embodiment of the present disclosure.
Figure 5B:
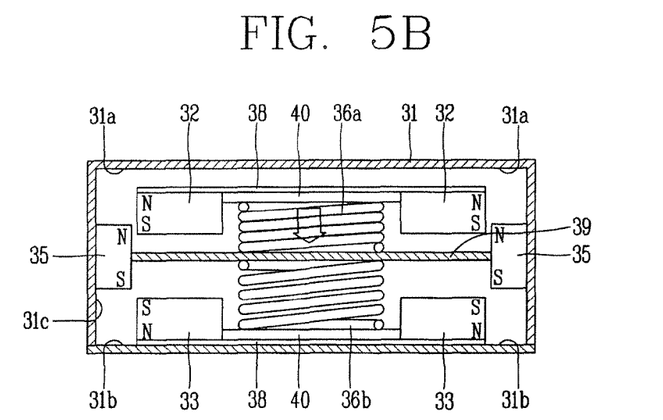
Figure 5C:
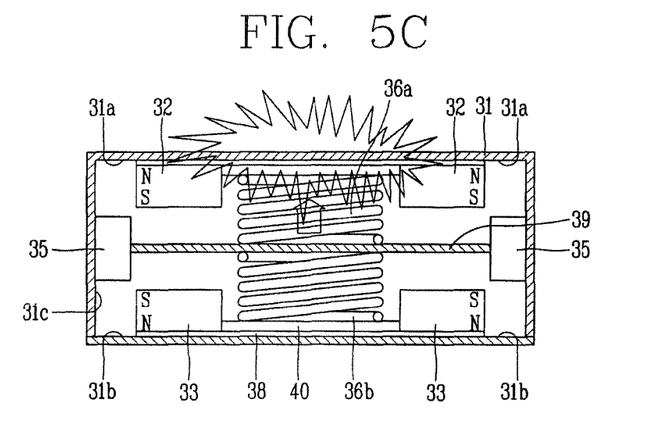

FIGS. 5A to 5C are cross-sectional views illustrating an operational state of the tactile operative module according to another embodiment of the present disclosure. As shown in FIGS. 5A to 5C, the upper and lower magnetic devices 32 and 33 are separated by a partition wall 39 such that each magnetic device can move independently.

First and second elastic bodies 36a and 36b are provided between the upper magnetic device 32 and the partition wall 39 including between the lower magnetic device 33 and the partition wall 39. Thus, as shown in FIG. 5B, when the magnetic actuator 35 is magnetized when current flows through, the upper and lower magnetic devices 32 and 33 operate independently as illustrated in FIG. 5C.

Figure 6A:
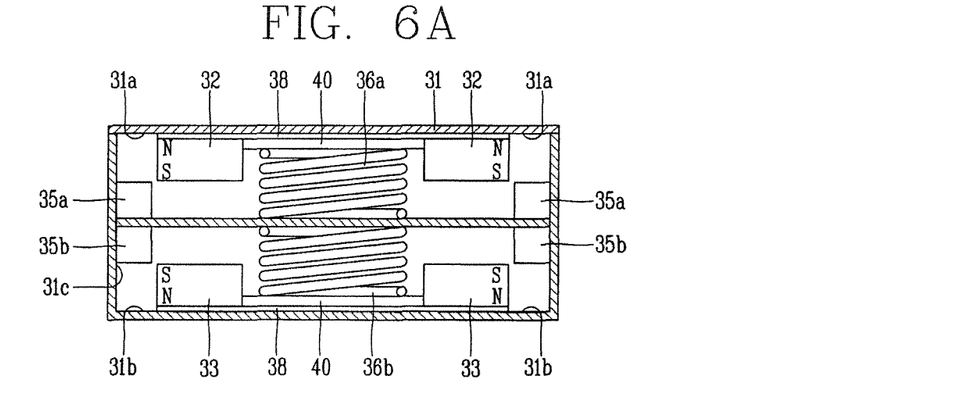
FIGS. 6A to 6C are cross-sectional views illustrating an operational state of the tactile operative module according to still another embodiment of the present disclosure.
Figure 6B:
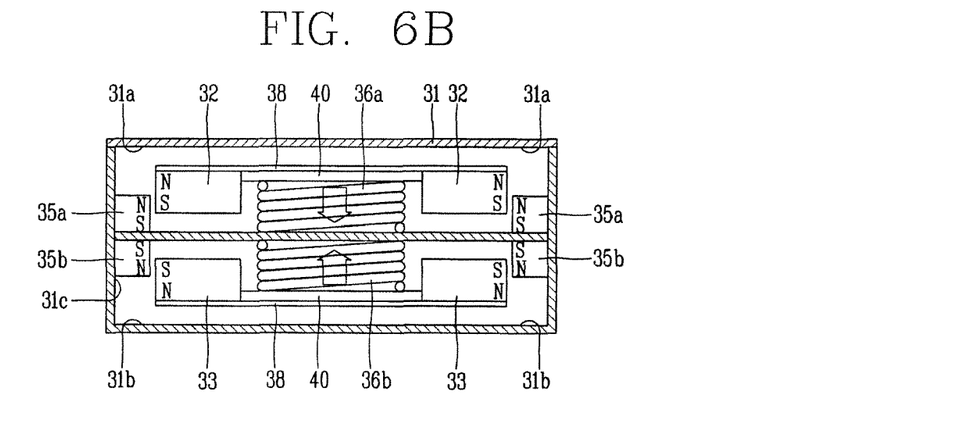
Figure 6C:
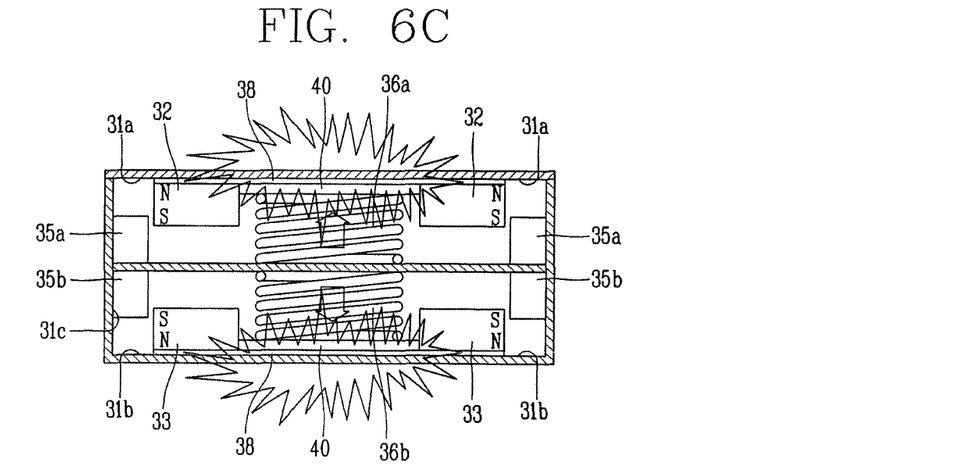

FIGS. 6A to 6C are cross-sectional views illustrating an operational state of the tactile operative module according to still another embodiment of the present disclosure. As shown in FIGS. 6A to 6C, the upper and lower magnetic devices 32 and 33 are separated by a partition wall 39 such that each magnetic device can move independently. The magnetic actuator 35 is partitioned into a first magnetic actuator 35a and a second magnetic actuator 35b to displace the first and second magnetic devices 32 and 33 substantially at the same time. First and second elastic bodies 36a and 36b are provided between the upper magnetic device 32 and the partition wall 39 including between the lower magnetic device 33 and the partition wall 39. Thus, as shown in FIG. 6B, by controlling the current flow through the first magnetic actuator 35a and the second magnetic actuator 35b, the upper and lower magnetic devices 32 and 33 can simultaneously apply an impact to the upper and lower inner walls 31a and 31b independently as illustrated in FIG. 6C.

Figure 7A:
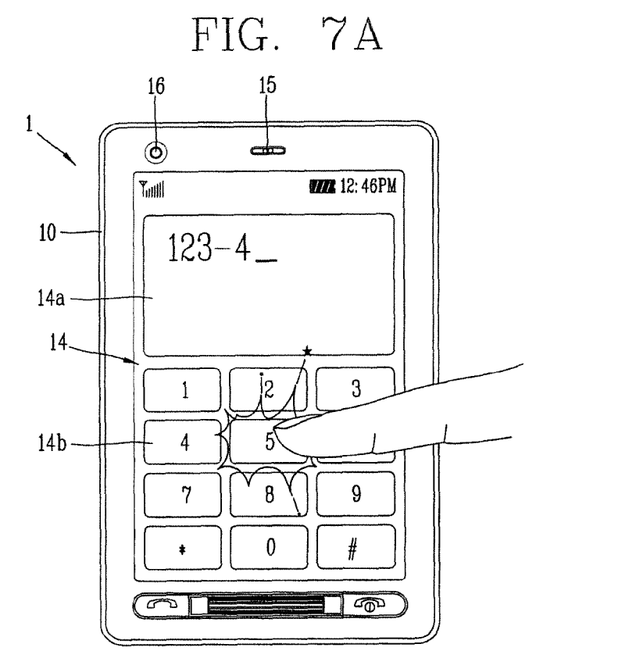
FIGS. 7A and 7B illustrate operational states of the portable terminal according to an embodiment of the present disclosure.
Figure 7B:
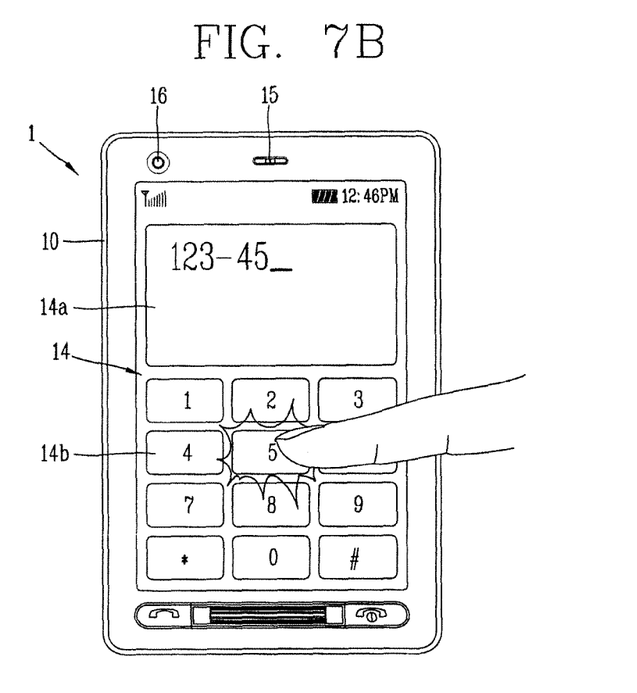

FIGS. 7A and 7B illustrate operational states of the portable terminal according to an embodiment of the present disclosure. The touch screen 14 may display a keypad 14b that can be touched to input numbers or characters.

The terminal body 10 includes a tactile operation module (not shown) as disclosed above. The magnetic actuator 35 may be configured to be magnetized so as to be varied according to an item for which an impact is to be input or according to the number of applied impacts.

If the user touches a number '5' on the keypad 14b, the terminal generates two corresponding impacts to provide the same "clicking" sensation as when the user provides an input in a pressing manner. As a result of the pressed key or button on the keypad 14b, the numerical figure '5' is displayed on the screen 14a.

With such configuration, when the user performs inputting via the touch screen 14, which is configured to avoid a complicated boundary in the external appearance of the terminal body 10, a click effect can be provided. Thus, because the user can recognize whether a particular input or function has been executed through the tactile sensation, the usability of the portable terminal 1 can be improved.

FIGS. 8A to 8C and 9A to 9C are cross-sectional views illustrating the tactile operative module according to an embodiment of the present disclosure. In this embodiment, elastic bodies 136a and 136b are formed to be supported between the magnetic devices 132 and 133 and the upper inner wall 131a and lower inner wall 131b of the housing 131.

Figure 8A:
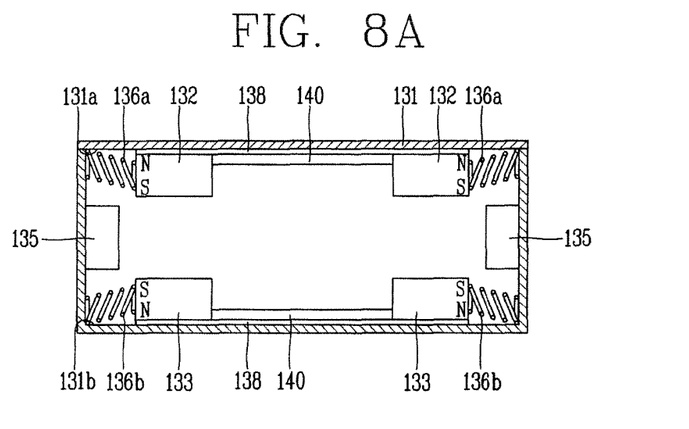
FIGS. 8A to 8C and 9A to 9C are cross-sectional views illustrating the tactile operative module according to an embodiment of the present disclosure.
Figure 9A:
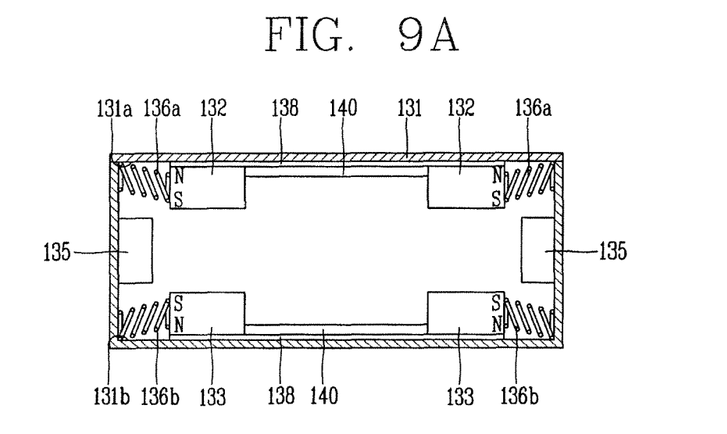

The elastic bodies 136a and 136b may be disposed to have a right angle with respect to a movement direction of the magnetic devices 132 and 133. In this case, the elastic bodies 136a and 136b may be formed as a tensile spring or rubber.

Figure 8B:
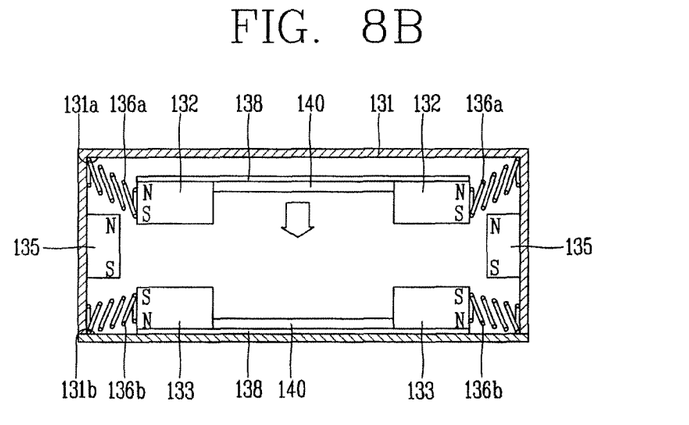
Figure 8C:
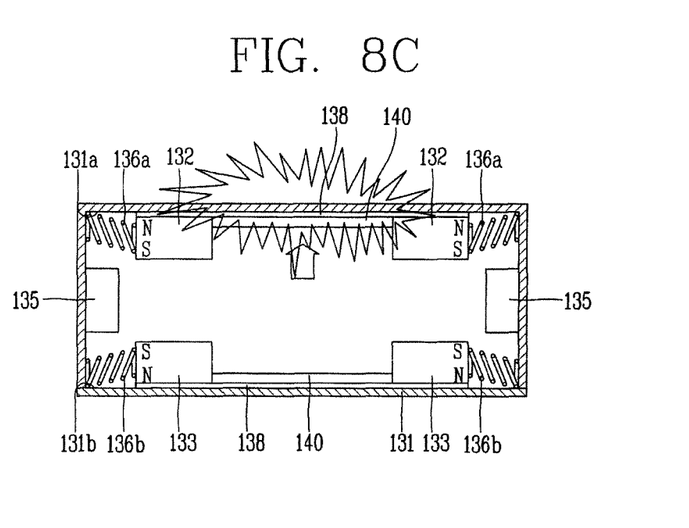
Figure 9B:
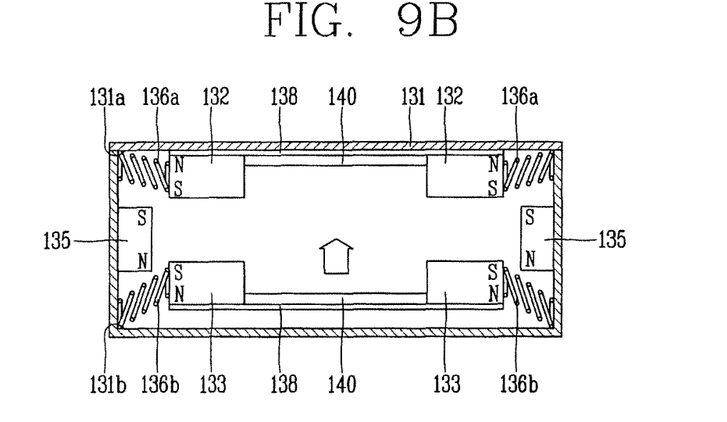
Figure 9C:
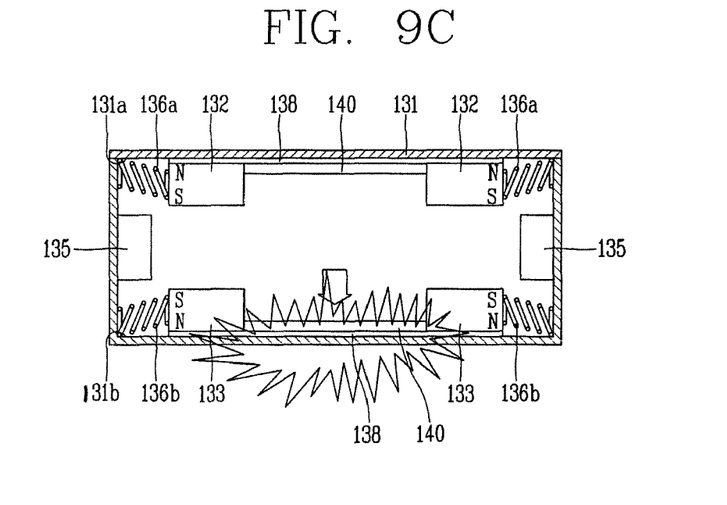

Accordingly, as shown in FIGS. 8B and 9B, when current is applied to the magnetic actuator 135, the magnetic devices 132 and 133 move in the direction in which the elastic body 136a is elongated by interworking with the magnetism of the magnetic actuator 135. With reference to FIG. 8B, the elastic body 136a is elongated downward thereby creating a recoiling force towards the upper inner wall 131a as illustrated in FIG. 8C. Alternatively, the elastic body 136b is elongated upward, as illustrated in FIG. 9B, thereby creating a recoiling force towards the lower inner wall 131b as illustrated in FIG. 9C.

Besides the case illustrated in FIGS. 8A to 8C and 9A to 9C, the tactile operation module can include a single elastic body disposed between a single magnetic device and the inner wall of the housing. In this case, the magnetism of the magnetic actuator may be configured to move the magnetic device in a direction that a repelling force is applied to the elastic body thereby applying an impact the inner wall of the housing.

Figure 10:
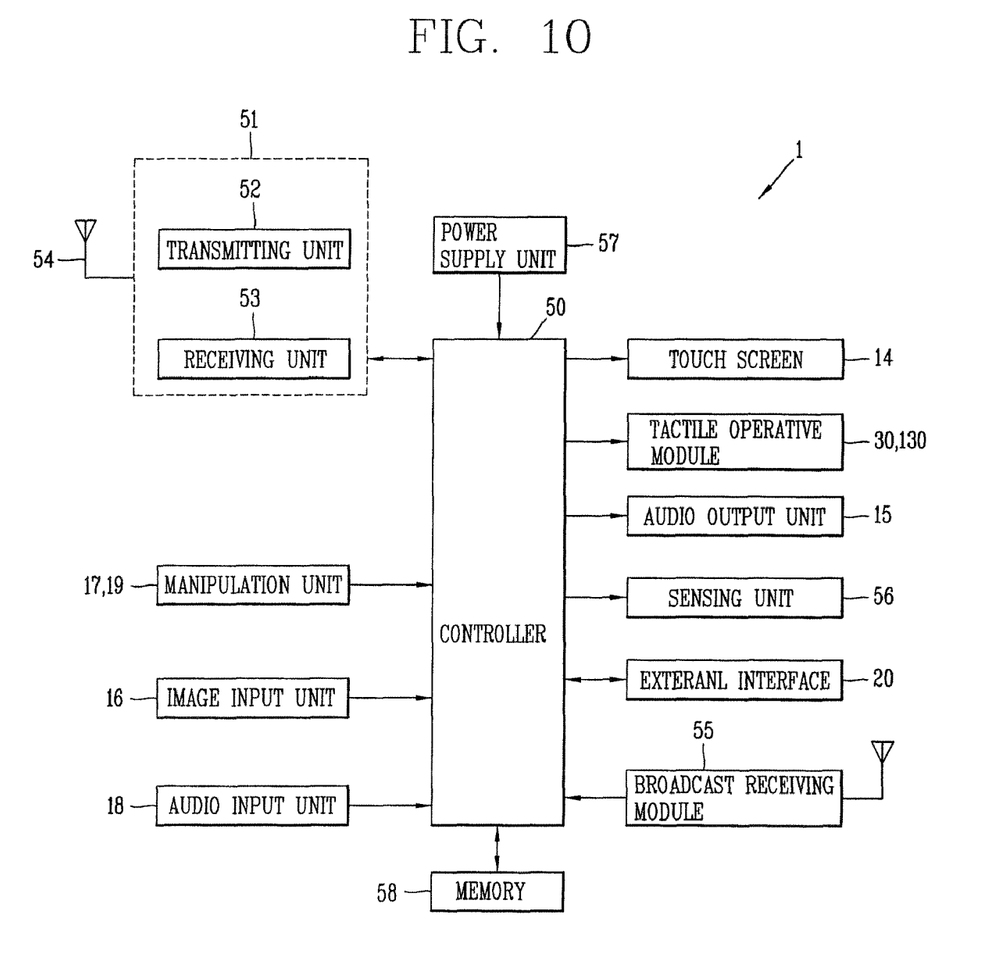
FIG. 10 is a schematic block diagram of the portable terminal according to an embodiment of the present disclosure.

FIG. 10 is a schematic block diagram of the portable terminal 1 according to an embodiment of the present disclosure. The portable terminal 1 includes a wireless communication module 51, manipulation units 17 and 19, an image input unit 16, an audio input unit 18, a touch screen, 14, an audio output unit 15, a sensing unit 56, an external interface 20, a broadcast receiving module 55, a memory 58, a power supply unit 57, a tactile operative module 30 and a controller 50.

The controller 50 controls a general operation of the portable terminal 1. For example, the controller 50 performs controlling and processing for voice calls, data communication and video communication. In addition, the controller 50 controls the operation of the tactile operative module 30 according to the present disclosure besides the general operation.

The wireless communication module 51 transmits and receives radio signals to/from a mobile communication base station via an antenna 54. For example, the wireless communication module 51 handles transmission/reception of voice data, character data, image data, and control data under the control of the controller 50, for which the wireless communication module 51 includes a transmitting unit 52 for modulating and transmitting a signal, and a receiving unit 53 for demodulating a received signal.

The manipulation units 17 and 19 are configured as shown in FIG. 1 and provide key input data input by the user to the controller 50 to control the operation of the terminal 1. The manipulation units 17 and 19 may be formed as a dome switch, a touch pad (capacitance/static pressure), jog wheel, and jog switch.

The image input unit 16 processes image frames such as a still image or video obtained by an image sensor in a video call mode or an image capture mode. The processed image frames are converted into image data that can be displayed on the touch screen 14. The image frame processed by the image input unit 16 may be stored in the memory 58 to be transmitted via the wireless communication module 15 under the control of the controller 50.

The audio input unit 18 receives an external audio signal via a microphone in a call mode, a recording mode or a voice recognition mode and processes the external audio signal into electrical audio data. The processed audio data is converted into a form that can be transmitted to the mobile communication base station via the wireless communication module 51 in case of a call mode, so as to be outputted to the wireless communication module. In case of a record mode, the processed voice data is output to be stored in the memory 58. The audio input unit 18 may implement various noise canceling algorithms to cancel noise generated in the process of inputting external audio signals.

The touch screen 14 displays and outputs information processed in the portable terminal 1. For example, when the portable terminal 1 is in the call mode, the touch screen 14 displays and outputs a user interface (UI) or a graphic user interface (GUI) related to a call under the control of the controller 50. When the portable terminal 1 is in the video call mode or in the image capture mode, the touch screen 14 displays and outputs a captured image, a UI or a GUI under the control of the controller 50.

In addition, the touch screen 14 is used as an input device as well as an output device. When the touch screen 14 is touched, the controller 50 recognizes the touched position and performs a corresponding input operation.

When a touch is applied to the touch screen 14, the controller 50 applies a control signal to the tactile operative module 30 to adjust the magnetism and operation time of the magnetic actuator 35. The controller 50 operates the magnetic actuator 35 via direction, strength and time of pre-set magnetism to allow the portable terminal 1 to provide various tactile sensations to the touch screen 14.

The audio output unit 15 converts audio data received from the wireless communication module 51 in the call signal reception, call mode, record mode, voice recognition mode, broadcast receiving mode, or audio data stored in the memory 58 and outputs the audio data to the outside under the control of the controller 50.

Also, the audio output unit 15 outputs an audio signal related to functions (e.g., call signal reception sound, message reception sound, etc.) performed in the portable terminal 1. The audio output unit 15 may include a speaker, a receiver, and a buzzer.

The sensing unit 56 detects a current state of the portable terminal 1 such as whether the portable terminal 1 is in an open or closed state, the location of the portable terminal 1, whether the user is in contact with the portable terminal 1, and generates a sensing signal for controlling the operation of the portable terminal 1. For example, when the portable terminal 1 is a slide type phone, the sensing unit 56 senses whether the slide phone is open or closed and outputs the sensing result to the controller 50 so that the operation of the portable terminal 1 can be controlled. In addition, the sensing unit 56 handles a sensing function in association with whether power is supplied to the power supply unit 57, and whether the external interface 20 is connected to an external device.

The external interface 20 serves as an interface for various external devices such as a wired/wireless head set, an external recharger, a wired/wireless data port, and a card socket (e.g., a memory card, SIM/UIM card) that connects to the portable terminal 1. The external interface 20 may receive data or power from an external device and transfer to each element of the portable terminal, or transmit internal data of the portable terminal to an external device.

The memory 58 may store a program for processing data or controlling the controller 50, or may perform a function of temporarily storing input/output data (e.g., phone book, message, still image, video, etc.). In addition, the memory 58 may store a program for controlling an operation of the tactile operative module 30 according to the present disclosure. The memory 58 may include a generally known hard disk, a card type memory (e.g., SD or XD memory, etc.), a flash memory, A RAM, and a ROM.

The broadcast receiving module 55 receives a broadcast signal transmitted via a satellite or terrestrial waves, converts the broadcast signal into broadcast data to be output to the audio output unit 15 and the touch screen 14, and outputs the converted broadcast signal to the controller 50. Additionally, the broadcast receiving module 55 receives supplementary data related to broadcasting (e.g., an electric program guide (EPG), and a channel list). The broadcast data or supplementary data converted in the broadcast receiving module 55 may be stored in the memory 58.

The power supply unit 57 receives external or internal power and supplies power required for the operation of each element under the control of the controller 50.

The generation of the impact by magnetic devices and the magnetic actuator according to the present disclosure can be applied for various tactile signals that can be provided via the portable terminal 1.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A portable terminal, comprising:
   a touch screen display; and
   a housing disposed beneath the touch screen display and configured to transmit a tactile signal to at least a touched portion of the touch screen display;
   at least one magnetic device configured to create the tactile signal upon impact with the housing; and
   a magnetic actuator disposed relative to the at least one magnetic device and configured to control a first magnetism to displace the at least one magnetic device comprising a second magnetism to cause the impact between the at least one magnetic device and the housing,
   wherein the at least one magnetic device comprises a first magnetic device and a second magnetic device,
   wherein the first magnetic device is disposed at a first end of the housing,
   wherein the second magnetic device is disposed at a second end of the housing, and
   wherein the first magnetic device is configured to recoil independently of the second magnetic device.

2. The portable terminal of claim 1, further comprising a damping device disposed adjacent to the at least one magnetic device and configured to reduce the impact between the at least one magnetic device and the housing.

3. The portable terminal of claim 1, wherein the first magnetic device is configured to impact a top end of the housing when displaced by the magnetic actuator in response to the touch of the touch screen display.

4. The portable terminal of claim 1, wherein the second magnetic device is configured to impact a bottom end of the housing when displaced by the magnetic actuator in response to the touch of the touch screen display.

5. The portable terminal of claim 1, wherein:
   the first magnetic device is configured to impact a top end of the housing when displaced by the magnetic actuator in response to the touch of the touch screen display; and the second magnetic device is configured to impact a bottom end of the housing when displaced by the magnetic actuator in response to the touch of the touch screen display.

6. The portable terminal of claim 1, wherein the first magnetic devices and the second magnetic device comprise opposing magnetic poles and are configured such that one of the first magnetic device or the second magnetic device impacts the housing when displayed by the magnetic actuator in response to the first magnetism of the magnetic actuator.

7. The portable terminal of claim 1, further comprising an elastic device coupled to the at least one magnetic device and configured to recoil from displaced position to bias the at least one magnetic device to impact the housing.

8. The portable terminal of claim 7, wherein the elastic device is disposed between a plurality of magnetic devices of the at least one magnetic device.

9. The portable terminal of claim 1, further comprising a plurality of elastic device, wherein each of the plurality of elastic devices is coupled to a magnetic device of the at least one magnetic device.

10. The portable terminal of claim 9, wherein each of the plurality of elastic devices is positioned at a distal end of the housing and is configured to elongate when the magnetic device to which it is coupled is displaced.

11. A portable terminal, comprising:
a touch screen display;
a housing disposed beneath the touch screen display and configured to transmit a tactile signal to at least a touched portion of the touch screen display;
at least one magnetic device configured to create the tactile signal upon impact with the housing, wherein the at least one magnetic device comprises a first magnetic device disposed at a first end of the housing and a second magnetic device disposed at a second end of the housing;
a magnetic actuator disposed relative to the at least one magnetic device and configured to control a first magnetism to displace the at least one magnetic device comprising a second magnetism to cause the impact between the at least one magnetic device and the housing; and
a partition wall mounted in the housing and configured to provide independent displacement between the first magnetic device and the second magnetic device.

* * * * *